United States Patent
Burger

[11] Patent Number: 5,980,674
[45] Date of Patent: Nov. 9, 1999

[54] METHOD FOR MANUFACTURING TUBULAR CONSTRUCTIONS FROM FIBER REINFORCED THERMOPLASTIC SHEETS

[75] Inventor: George W. Burger, Rocklin, Calif.

[73] Assignee: Hillerich & Bradsby Co., Louisville, Ky.

[21] Appl. No.: 08/798,952

[22] Filed: Feb. 11, 1997

[51] Int. Cl.[6] ............................ B29C 53/56; B29C 53/62
[52] U.S. Cl. ....................... 156/189; 156/190; 156/195; 156/446
[58] Field of Search .................... 156/184, 187, 156/188, 190, 195, 215, 173, 189, 446

[56] References Cited

U.S. PATENT DOCUMENTS

| | | | |
|---|---|---|---|
| 1,921,516 | 8/1933 | Frederick | 156/184 |
| 2,649,133 | 8/1953 | Just . | |
| 2,674,557 | 4/1954 | Boggs . | |
| 2,964,065 | 12/1960 | Haroldson et al. . | |
| 3,125,478 | 3/1964 | Pratt . | |
| 3,715,252 | 2/1973 | Fairbairn | 156/184 X |
| 3,794,538 | 2/1974 | Christie et al. | 156/190 X |
| 4,054,250 | 10/1977 | Herubel | 242/18 DD |
| 4,080,879 | 3/1978 | Hoden et al. . | |
| 4,100,009 | 7/1978 | Nakajima et al. | 156/184 |
| 4,261,456 | 4/1981 | Scarpa et al. | 198/460 |
| 4,273,601 | 6/1981 | Weingart . | |
| 4,579,617 | 4/1986 | Oberg et al. . | |
| 4,900,383 | 2/1990 | Dursch et al. | 156/184 |
| 4,923,541 | 5/1990 | Burger . | |
| 5,024,712 | 6/1991 | Lecourt et al. . | |

FOREIGN PATENT DOCUMENTS

| | | | |
|---|---|---|---|
| 596389 | 1/1948 | United Kingdom | 156/184 |

*Primary Examiner*—Curtis Mayes
*Attorney, Agent, or Firm*—Bernhard Kreten

[57] ABSTRACT

A method and apparatus for manufacturing tubular articles from fiber reinforced thermoplastic sheets. A horizontal conveyor feeds the sheets to a vertical wrapping belt. The sheets are heated on the conveyor to a molten state and fed to a mandrel rotated by the belt. The molten sheets are wrapped around the mandrel and cooled by the action of the belt to form an integral structure.

26 Claims, 5 Drawing Sheets

METHOD FOR MANUFACTURING TUBULAR CONSTRUCTIONS FROM FIBER REINFORCED THERMOPLASTIC SHEETS

FIELD OF THE INVENTION

This invention relates generally to a method and apparatus for forming hollow pipes and structural elements using flat fiber reinforced thermoplastic sheets. This sheet material possesses desirable strength, corrosion resistance, workability and appearance, and is displacing metals in many applications. There is a need to develop methods and apparatus to mold this material into useful forms.

BACKGROUND OF THE INVENTION

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| U.S. Pat. No. | ISSUE DATE | INVENTOR |
| --- | --- | --- |
| 2,649,133 | August 18, 1953 | Just |
| 2,674,557 | April 6, 1954 | Boggs |
| 2,964,065 | December 13, 1960 | Haroldson, et al. |
| 3,125,478 | March 17, 1964 | Pratt |
| 4,080,879 | March 28, 1978 | Hodén, et al. |
| 4,273,601 | June 16, 1981 | Weingart |
| 4,579,617 | April 1, 1986 | Oberg, et al. |
| 4,923,541 | May 8, 1990 | Burger |
| 5,024,712 | June 18, 1991 | Lecourt, et al. |

The patent to Boggs (U.S. Pat. No. 2,674,557) teaches a process of making tubular structures out of a glass fibre mat impregnated with liquid thermosetting resinous material and winding the treated mat around a mandrel by means of an enveloping belt. The mandrel and belt operate in a heated oven to heat cure the resinous material.

The patent to Oberg, et al. (U.S. Pat. No. 4,579,617) teaches an apparatus and method for manufacturing cylindrical components such as tanks and pipes by winding layers of sheet material around a rotating mandrel. FIG. 3 shows a flat sheet (8) being softened by a heating source (9) so as to cause it to drop onto the rotating mandrel. Other layers are directly wound on the mandrel without being heat softened. The various layers are bonded to each other by an adhesive spray which is applied as the mandrel rotates.

The patent to Burger (U.S. Pat. No. 4,923,541) issued to applicant on May 8, 1990 teaches a method and apparatus for manufacturing composite tubes which disclose some concepts related to the present invention. The method in U.S. Pat. No. 4,923,541 employs an inflatable floating mandrel (21) caged in a frame (23). A conveyor sheet (22) is wrapped around the mandrel and composite sheet material placed on the conveyor is also wrapped around the mandrel. The various layers employed are coated with a resin. The mandrel with its partially formed tube is then removed from the cage and inserted into a hollow mold and expanded to shape the tube to the internal surface of the mold.

The apparatus and method of the instant invention differ in major respects over the patented devices as will be described in the descriptive portions of the specification.

The other prior art listed above but not specifically described further catalog the prior art of which the applicant is aware. These references diverge even more starkly from the references specifically distinguished above.

SUMMARY OF THE INVENTION

This invention teaches a method and apparatus to mold flat fiber reinforced thermoplastic sheeting into elongated tubular shapes of various configurations. The sheeting is placed on a conveyor which carries it under a heater, softening the material and causing it to drop and be wrapped around a rotating mandrel. Sheet material of different strengths and formulations may be layered around the mandrel. The shape of the completed article is determined by the shape of the mandrel.

OBJECTS OF THE INVENTION

It is an object of the present invention to provide an apparatus for making tubular structures composed of advanced composite materials in sheet form. The apparatus is of simple design and can produce articles of different shapes depending upon the shape of the mandrel.

It is a further object of the present invention to provide a device as characterized above which provides a separate closed loop conveyor to transport the sheet material in a heat softened condition to the mandrel. A separate closed loop wrapping belt is looped around the mandrel and tightly wraps the sheet material around the mandrel enabling the manufacture of structures of varied shapes.

It is a further object of the present invention to provide a device as characterized above which tensions the closed loop wrapping belt by means of a pressurized bladder to maintain a fairly constant wrapping pressure around the mandrel.

It is a further object of the present invention to provide a device as characterized above which provides a process controller to automate the operation including motor control the conveyor and wrapping belts, temperature control of the heaters, and pressure control of the bladder.

It is a further object of the present invention to provide a device as characterized above which is easy to produce and lends itself to mass production.

Viewed from a first vantage point it is an object of the present invention to provide a method of fabricating a composite tubular member, comprising the steps of: providing a supporting frame; mounting a conveyor having a delivery end on the supporting frame; placing at least one sheet of thermoplastic material on the conveyor; conveying the sheet beneath a source of heat to soften the sheet; providing a closed loop wrapping belt supported by spaced lower driving and upper tension rollers to lie in a vertical position orthogonally related to, but spaced from the conveyor delivery end; arranging two wrapping rollers in spaced parallel relationship within the wrapping belt loop to form a gap coextensive with the conveyor delivery end; feeding a bight portion of the wrapping belt into the gap to form an open loop behind the wrapping rollers; inserting an elongated mandrel in the open loop to be trapped behind the wrapping rollers; tensioning the wrapping belt and driving the driving roller causing the wrapping belt to circulate and to rotate the wrapping rollers in a first direction and the mandrel behind the wrapping rollers in a second, opposite direction; and conveying the softened sheet into the gap onto the moving wrapping belt whereby the sheet is fed to the rotating mandrel and wrapped therearound in spiral fashion.

Viewed from a second vantage point it is an object of the present invention to provide a method of making tubular articles from fiber reinforced thermoplastic sheets wrapped around a rotating mandrel, comprising the steps of: providing two elongated wrapping rollers in spaced parallel relationship, forming a working gap therebetween; surrounding the wrapping rollers and gap with a closed loop wrapping belt supported by a drive and tension roller, the wrapping belt having a portion in confronting relationship with the wrapping rollers and gap; passing a bight portion of the belt into the gap to form an open loop behind the wrapping rollers; inserting an elongated mandrel into the open loop; tensioning and driving the belt by activating the tension roller and the drive roller so that the belt frictionally engages said mandrel to rotate the mandrel against the wrapping rollers; and feeding semi-molten fiber reinforced thermoplastic sheets into the gap to be wrapped around the rotating mandrel to be fused and cooled by the wrapping belt.

Viewed from a third vantage point it is an object of the present invention to provide an apparatus for making tubular articles from fiber reinforced thermoplastic sheets, comprising, in combination: a frame; an upper and lower elongated wrapping roller mounted on the frame in spaced parallel relationship forming a working gap therebetween; a closed loop wrapping belt supported on the frame by tension and driving rollers, the wrapping belt surrounding the wrapping rollers; a bight portion of the wrapping belt inserted in the gap to form an open loop behind the wrapping rollers; an elongated mandrel seated in the open loop; means to tension and drive the wrapping belt to rotate the mandrel; and a conveyor belt mounted on the frame to feed semi-molten sheets of fiber reinforced thermoplastic material into the gap whereby the sheets are wound around the rotating mandrel.

These and other objects will be made manifest when considering the following detailed specification when taken in conjunction with the appended drawing figures.

DESCRIPTION OF PREFERRED EMBODIMENTS

Figure 1:
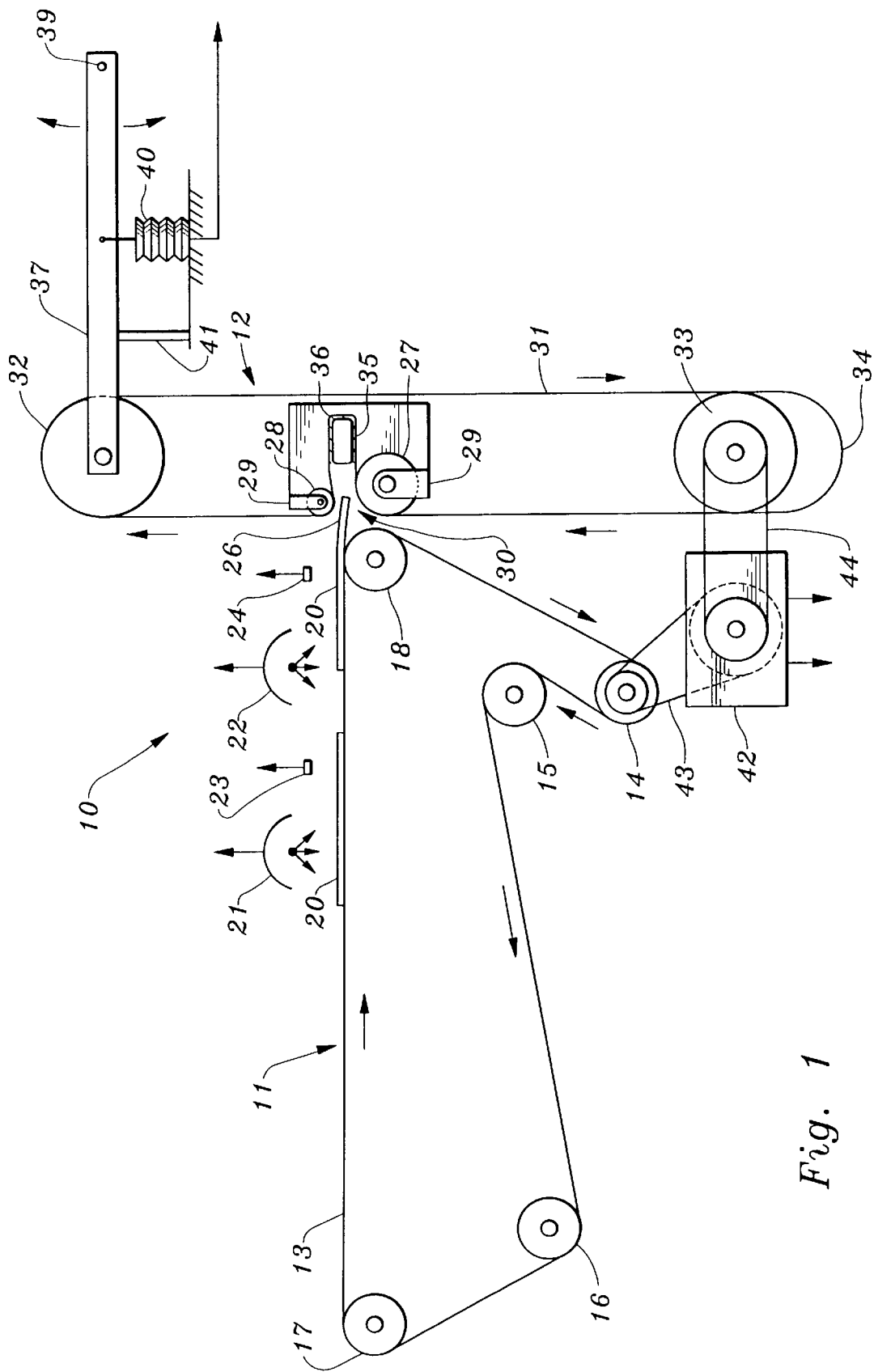
FIG. 1 is a schematic view of the hollow article forming apparatus according to the present invention.

Considering the figures, wherein like reference numerals denote like parts throughout the various drawing figures, reference numeral 10 is directed to the apparatus according to the present invention. The apparatus 10 is formed of two basic systems consisting of a closed loop conveyor belt system 11 and a closed loop wrapping belt system 12. The closed loop conveyor system 11 heat treats and delivers flat fiber reinforced thermoplastic sheeting to the closed loop wrapping belt system 12 where it is wrapped around a mandrel to form a useful article.

Referring now to the schematic operational view of FIG. 1 when considered with the working views of FIGS. 2 through 8, a closed loop conveyor belt 13 is shown driven by roller 14 and guided by idler rollers 15 through 18 to circulate in a closed path indicated by the directional arrows. A skeleton frame 19 formed of welded steel tubes and braces supports the rollers 14 through 18, as well as all other components of the device, in a rigid spaced relationship. Idler roller 15 also serves as a tensioning roller and can be laterally adjusted on frame 19 to control the tension of conveyor belt 13.

Figure 2:
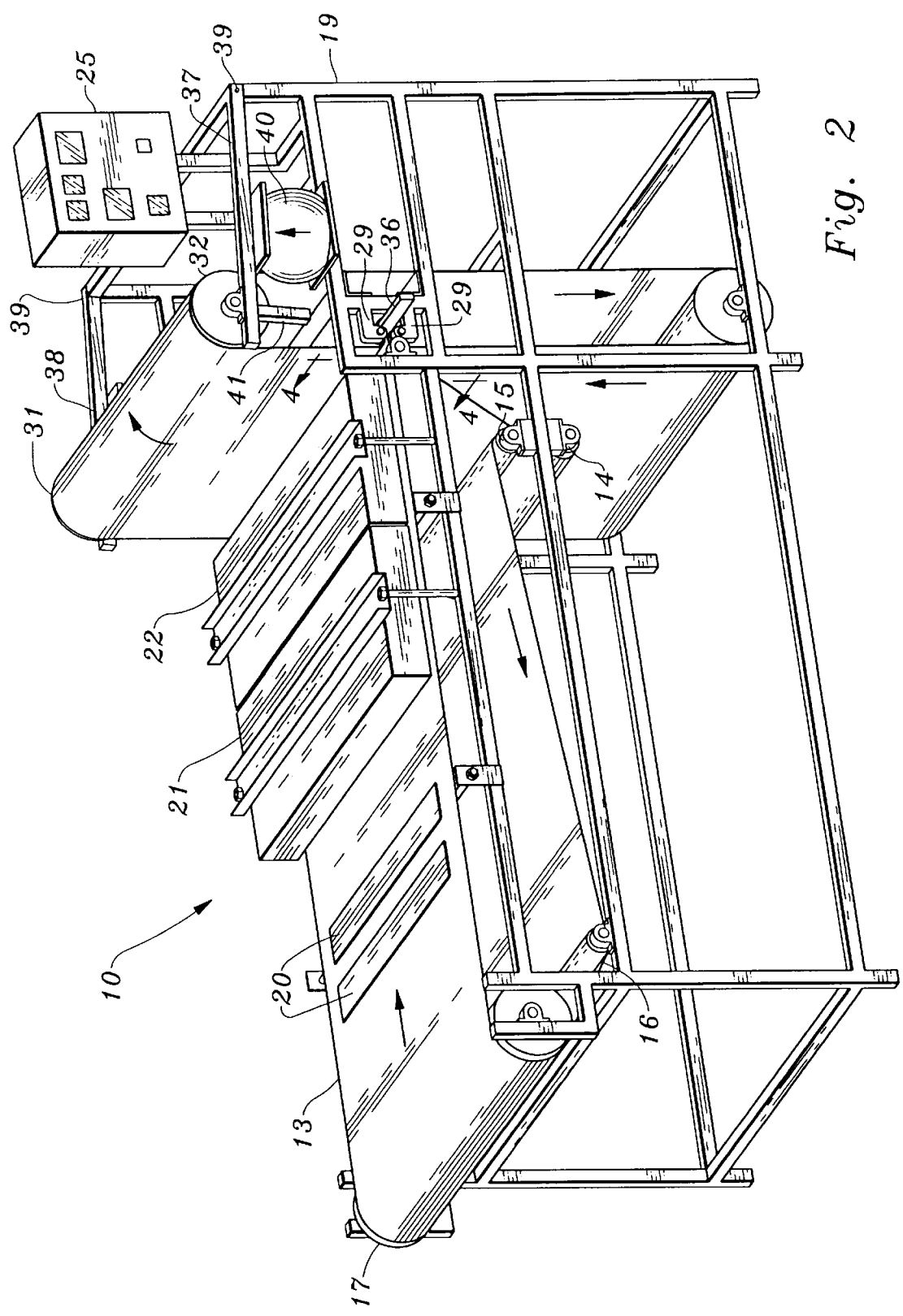
FIG. 2 is a perspective view of that which is shown in FIG. 1.
Figure 3:
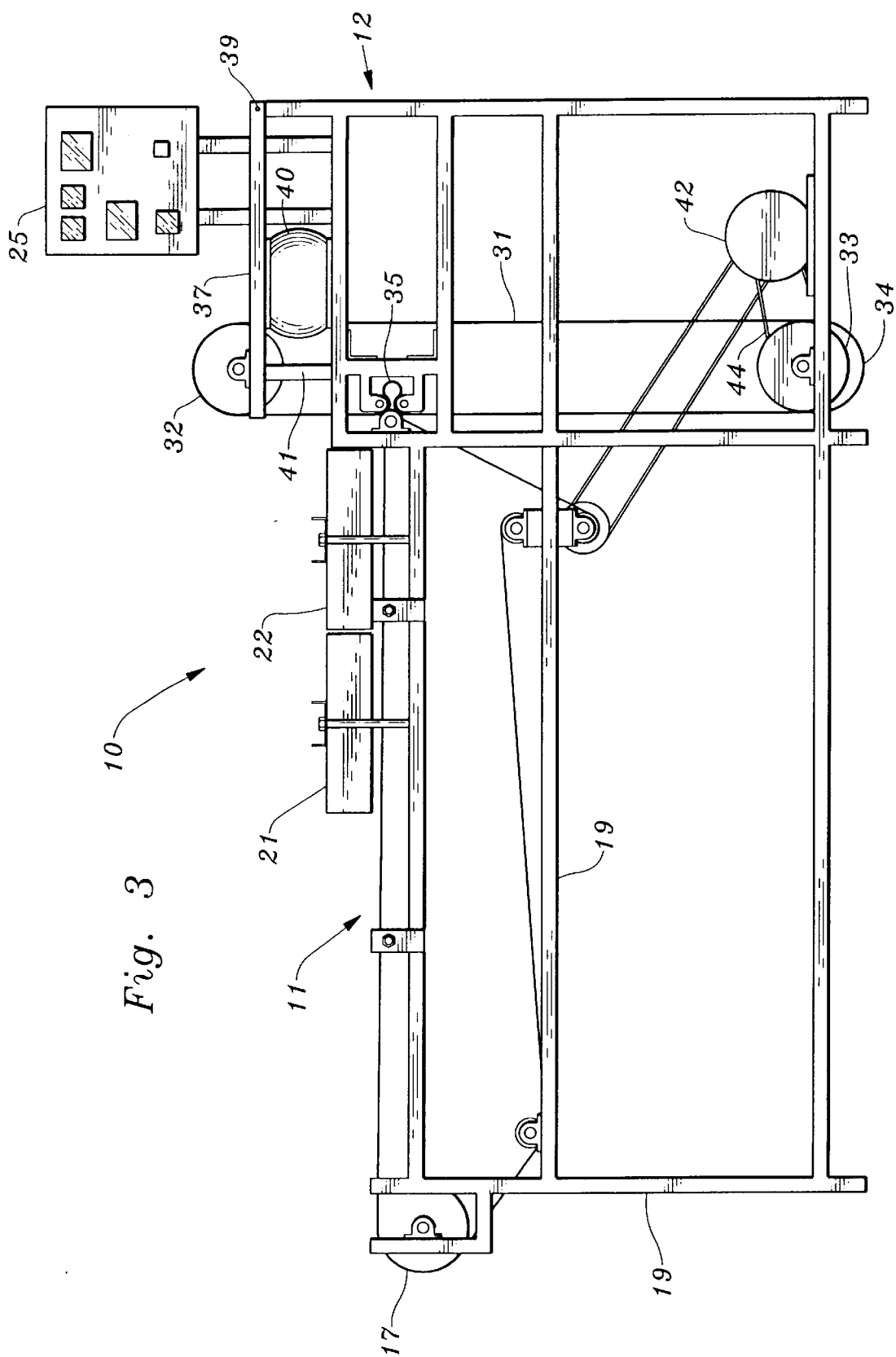
FIG. 3 is a side elevational view of that which is shown in FIG. 2.

As best seen in FIG. 2, conveyor belt 13 must be wide enough to accommodate the longest dimension of the article to be formed. Belt width can be scaled to fit the product dimensions.

It is preferred that the conveyor belt be formed as a single, wide web. As an alternative, the belt can be made of a plurality of webs mounted in a side-by-side relationship.

The conveyor belt must be capable of withstanding a relatively high temperature and be resistant to creep. The preferred materials are TEFLON® coated KEVLAR® and fiberglass. Because of its low thermal conductivity, stainless steel can also be used.

Sheets 20 of fiber reinforced thermoplastic material are placed on the conveyor perpendicular to its directional axis of movement. The sheets may comprise graphite fibers embedded in a thermoplastic resin with the fibers of one sheet being angled differently from the fibers in an adjacent sheet. The number of sheets employed and the composition of the sheets can be varied to suit a particular application.

A pair of infrared heaters 21, 22 are mounted above the conveyor belt 13 so as to heat and soften sheets 20 as they are carried by the conveyor to the wrapping belt system 12. The operation of the heaters 21, 22 is staged under control of thermal sensors 23, 24 which are wired to a process controller 25. By staging the operation of the heaters 21, 22, a more precise sheet softening temperature is obtained over using a single heater having the same heat rating. There is a time and temperature relationship governing the softening of a particular sheet material which is determined by experimentation. Sheet softening temperatures beneath the heaters range from three hundred and fifty degrees to seven hundred and fifty degrees Fahrenheit.

After leaving the heaters, a softened sheet 20 encounters an abrupt change of direction on the conveyor at roller 18, and being unsupported, droops downwardly as it is fed into the wrapping belt assembly 12. The downward droop is shown at 26 in FIGS. 1, 5, 6, and 7.

The wrapping belt assembly receives the hot, semi-molten sheet 20 and wraps it around a mandrel in a process now to be described. A pair rollers 27, 28 are supported by four mounts 29 secured to frame 19 with each mount rotatably supporting an end shaft of its respective roller. Rollers 27 and 28 are supported in this manner to be generally parallel with roller 18 of the conveyor belt and to define a gap 30 spaced from the roller 18 but slightly below it.

A wrapping belt 31 is vertically supported in a perpendicular relationship with conveyor belt 13 by means of a tension adjustment roller 32 and a drive roller 33. The belt has a width substantially the same as rollers 27, 28 and is made of a heat resistant material such as fiberglass or silicone. The belt is formed in a closed loop with sufficient slack to hang loosely from tension roller 32 in the off mode as shown at 34 in FIGS. 1 and 3 where it forms a friction clutch with respect to drive roller 33.

In preparing the wrapping belt for its operational mode, a bight portion of the belt forming a loop 35 is inserted into gap 30. A mandrel 36 is then inserted lengthwise into the loop as best shown in FIGS. 1 and 2. Although the mandrel is shown in a rectangular cross-section, mandrels of other shapes may also be used, for example, circular, square, hexagonal, tear-drop and other shapes can be employed. The important consideration in mandrel selection is that the width dimensions must be greater than the width of gap 30 so that the loop and inserted mandrel will be trapped behind the gap. After the mandrel is installed behind gap 30, the wrapping belt is tensioned by adjusting the position of tension roller 32. A pair of spaced parallel lever arms 37 and 38 have one end pivoted to frame 19 at pivots 39 and the other end supporting the tension roller. An inflatable bladder 40 is positioned between each arm and frame 19 to lever the arms around pivots 39, thereby raising roller 32 and increasing the tension on the wrapping belt. A stop pin 41 carried by each arm limits lower movement of the arms.

Bladders 40 are inflated with air of relatively low pressure, but because of their large surface area, they can develop considerable lifting force. For example, with a pressure of 25 psi, some of the bladders tested developed a lifting force in excess of 1500 lbs. Because of the elasticity of air, the bladders maintain a constant tension on the wrapping belt as it rotates and reacts with the various rollers and mandrels. The ability to maintain a fairly constant predetermined belt tension allows the use of mandrels of diverse shapes and is an important feature of the invention.

To restore the wrapping belt to its slack position, it is necessary to release the air from the bladders and roller 32 will drop to the position determined by stop pins 41. The bladders can be inflated and deflated manually or the operation can be automated by process controller 25 and suitable solenoid valves.

Synchronization of the movement of the conveyor belt and the wrapping belt is important to the functioning of this invention. For this purpose, a combined motor and gear reduction unit 42 with two outputs is coupled to drive rollers 14, 33. A first output 43 is coupled to drive roller 14 while a second output 44 is coupled to drive roller 33. Chain drives or cog belts may be used to drive the loads.

Conveyor belt 13 should move at a speed slightly greater than the speed of belt 31 to prevent overfeeding of strips 20. An adjustable gear ratio is build into unit 42 to adjust the speed of belt 13 with respect to belt 31. Operation of unit 42 can be manually controlled or controlled by process controller 25.

A step-by-step operational description of the invention will now be given using as an example the manufacture of a rectangular tube using graphite fiber reinforced thermoplastic sheeting. When the apparatus is first turned on, motor and gear reduction unit 42 rotate drive rollers 14, 33. Rotation of drive roller 14 causes belt 13 to slowly circulate around idler rollers 14 through 18. Rotation of drive roller 33 at the time has no effect since belt 31 is effectively declutched by the action of friction clutch 34.

At the same time motor unit 42 is in operation, process controller 25 energizes infrared heaters 21, 22. When the heaters and belt 13 reach an operating temperature as signaled by a temperature readout in the process controller, bladders 40 are pressurized by the process controller or manually by an operator. Pressurization of the bladders causes arms 37, 38 to pivot around pivots 39 from the stop position determined by stop pin 41 to an elevated position determined by the removal of any slack in belt 31 by tension roller 32. The tension on belt 31, thus applied, is resilient in nature and can amount to hundreds of pounds and is easily adjusted by controlling the pressure in the bladders.

Tensioning of belt 31 activates friction clutch 34 and the belt then circulates around rollers 33, 27, 28 and 32 as shown by the direction arrows in FIGS. 1 and 2. Tensioning of the belt in the loop portion 35 surrounding the mandrel causes the mandrel to be gripped and pulled against rollers 27 and 28. The gap width 30 between the rollers being less than the width of the mandrel causes the mandrel to be rotated as shown in FIGS. 4 through 7.

The apparatus is now set to receive the sheet material to be wrapped. As shown in FIG. 2, two sheets of graphite fiber (or Kevlar, boron, etc.) reinforced thermoplastic material are centered on the slowly moving conveyor belt perpendicular to the direction of travel. It is again emphasized that the number and size of the sheets employed, the composition, including the fiber angle orientation, an the thickness are all maters of choice depending upon the requirements of the end product.

As shown in FIG. 1, the conveyor belt carries the sheets beneath a pair of staged infrared heaters. The first heater 21, under control of surface reading temperature control 23 connected to process controller 25, raises the temperature of the sheets to a first approximation. The second heater 22 under control of surface reading temperature control 24 modulates its heat output to obtain a more precise final molten or softening temperature. Obtaining a precise heating temperature of the sheets is a critical aspect of the invention. Overheating will result in partial melting and lumping while underheating will result in loose wrapping and poor bonding.

After leaving the heaters, the softened sheet is delivered by the conveyor into gap 30 where it droops as shown at 26 in FIGS. 1 and 5 through 7 and makes contact with the wrapping belt traveling over roller 27. The sheet is carried by the wrapping belt into contact with the mandrel where it is wound around the mandrel in spiral fashion.

Figure 4:
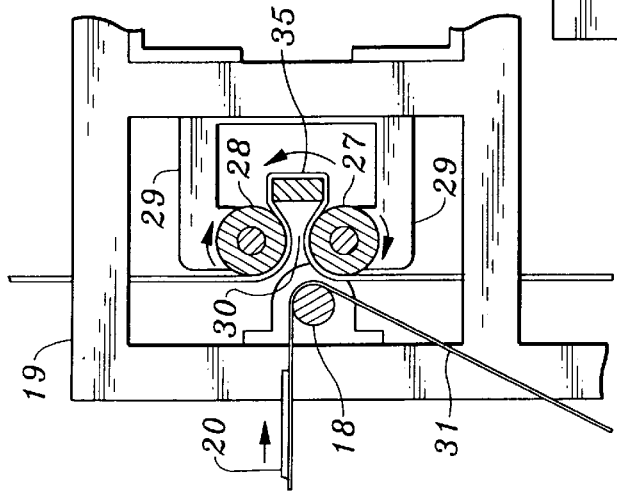
FIG. 4 is an exploded view showing the wrapping mechanism with a rectangular mandrel held by the wrapping belt at the beginning of the tube forming operation.
Figure 6:
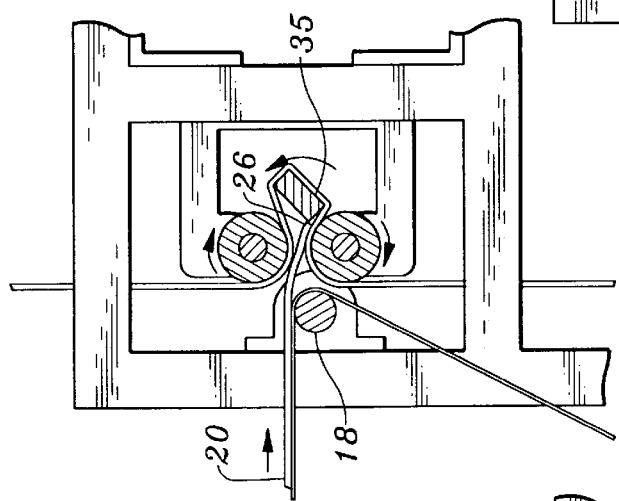
FIG. 6 shows the FIG. 5 relationship with the softened sheet material about to be wrapped around the mandrel.
Figure 5:
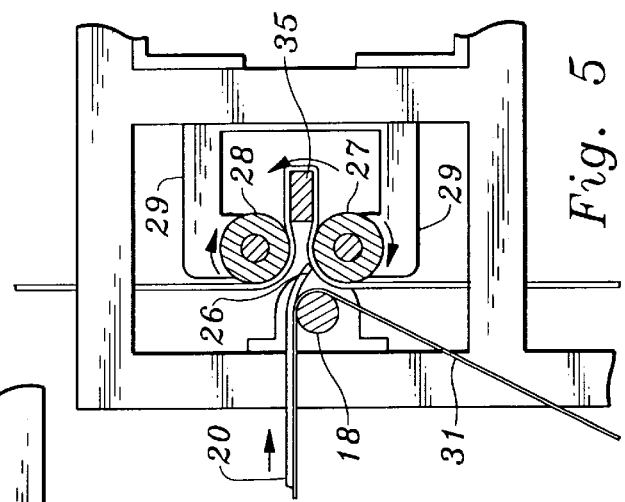
FIG. 5 shows the FIG. 4 relationship after the mandrel is rotated and the softened sheet material is about to enter the forming gap.
Figure 7:
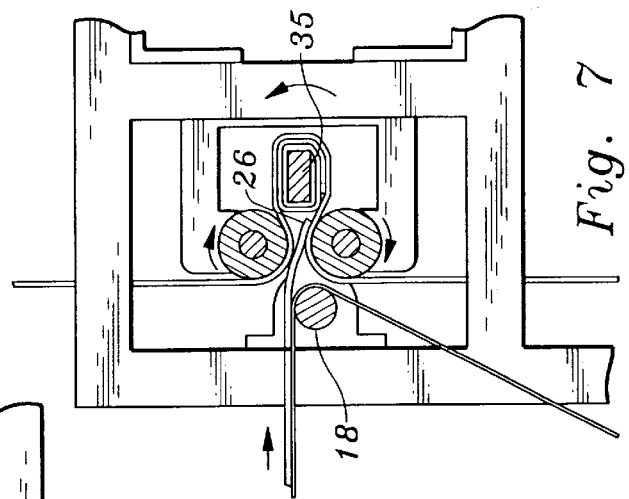
FIG. 7 shows the FIG. 6 relationship after the first sheet has been wrapped on the mandrel and a second sheet is in position to be wrapped.
Figure 8:
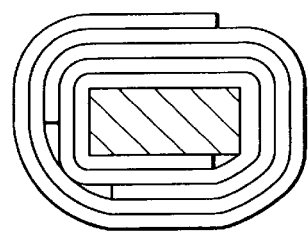
FIG. 8 is a cross-sectional view of the mandrel and its relationship to the wrapped layers.

FIGS. 4 through 7 are enlarged cross-sectional views illustrating the action which takes place in the gap 30 during the wrapping operation. FIG. 4 shows sheet 20 after leaving the heaters. FIG. 5 shows the sheet leaving the conveyor and drooping onto the wrapping belt. FIG. 6 shows the sheet contacting the mandrel and about to be wrapped. FIG. 7 shows the mandrel after one sheet has been wrapped with another about to be wrapped. FIG. 8 is a cross-sectional view of the mandrel after it has been removed with both sheets wrapped therearound. The mandrel is then removed, leaving behind the finished tube.

It is to be noted that the sheets of fiber reinforced thermoplastic material are permanently bonded by a fusion process rather than the use of an added coating of a resin or other adhesive. It is for this reason that this invention involves a critical interplay between the time the molten sheet reaches the mandrel and its cooling rate as it is wound on the mandrel to effect a neat and permanent bond.

Figure 9:
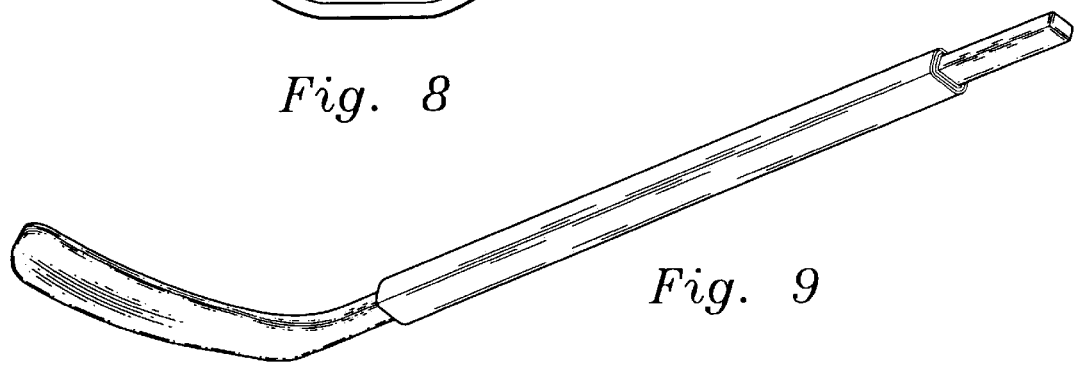
FIG. 9 shows a rectangular tube formed by the method of the present invention employed as a handle on a hockey stick.
Figure 10:
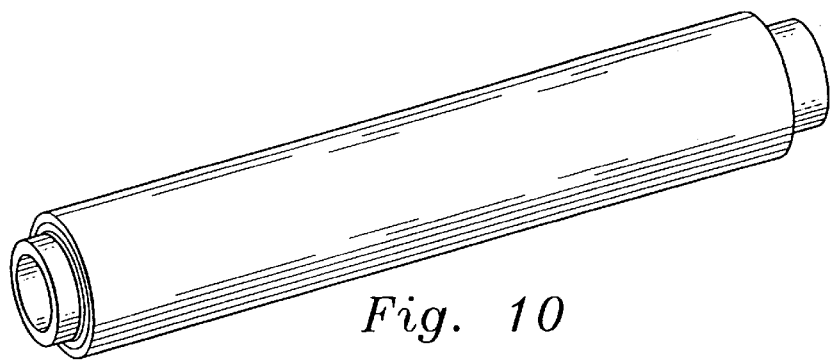
FIG. 10 shows a circular tube formed by the method of the present invention.
Figure 11:
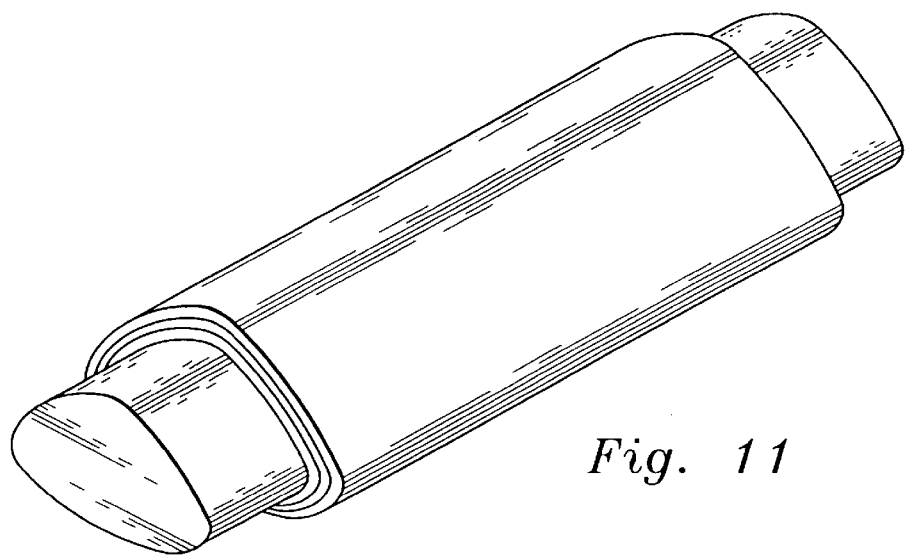
FIG. 11 shows a tear-drop tube formed by the method of the present invention employed as a streamlined strut.

FIGS. 9 through 11 show examples of the types of products manufactured in accordance with the teachings of the present invention. FIG. 9 shows a hockey stick employing a rectangular hollow plastic handle. FIG. 10 shows a circular tube and FIG. 11 shows an aerodynamic strut manufactured in a tear-drop shape.

It should also be noted that the relative size of wrapping rollers 27, 28 can be varied to optimize performance with various mandrel shapes. FIGS. 4 through 7 show rollers 27, 28 of the same diameter. Although same diameter rollers can be used with circular and non-circular mandrels, they are most effective with circular pipes and tubing. Having the bottom roller of a larger diameter than the top roller as shown in FIG. 1, functions best with non-circular mandrels. The reason for this is that a large diameter bottom roller acts as a rotating anvil permitting the mandrel to tumble and pound against the roller, improving the quality of the wrapped bond. The present design takes this into account and provision is made for the removal and change of rollers as needed.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A method of fabricating a composite tubular member, comprising the steps of:

providing a supporting frame;

mounting a conveyor having a delivery end on said supporting frame;

placing at least one sheet of thermoplastic material on said conveyor;

conveying said sheet beneath a source of heat to soften said sheet;

providing a closed loop wrapping belt supported by spaced lower driving and upper tension rollers to lie in a vertical position orthogonally related to, but spaced from said conveyor delivery end;

arranging two wrapping rollers in spaced parallel relationship within the wrapping belt loop to form a gap coextensive with the conveyor delivery end;

feeding a bight portion of said wrapping belt into said gap to form an open loop behind said wrapping rollers;

inserting an elongated mandrel in said open loop to be trapped behind said wrapping rollers;

tensioning said wrapping belt and driving said driving roller causing said wrapping belt to circulate and to rotate said wrapping rollers in a first direction and said mandrel behind said wrapping rollers in a second, opposite direction;

conveying said softened sheet into said gap onto said moving wrapping belt whereby said sheet is fed to said rotating mandrel and wrapped therearound in spiral fashion; and providing a motor drive on said frame having two driving outputs, one of said outputs drives said conveyor belt while the other said output drives said driving roller of said wrapping belt.

2. The method of claim 1 wherein said source of heat is an infrared heater.

3. The method of claim 1 wherein the turns of said sheet wrapped around said mandrel in spiral fashion are bonded to each other by fusion without the addition of any extraneous agents.

4. The method of claim 3 including plural sheets of thermoplastic material, each sheet comprising a fiber reinforced sheet of thermoplastic material with the fibers of one sheet being angled in a different manner from the fibers in an adjacent sheet.

5. The method of claim 1 wherein said flat conveyor belt is formed of a single sheet having a width slightly greater than the length of the article to be manufactured.

6. The method of claim 1 further comprising the steps of providing a motor drive on said frame having two driving outputs, one of said outputs drives said conveyor belt while the other said output drives said driving roller of said wrapping belt.

7. The method of claim 1 wherein said conveyor belt and said wrapping belt are simultaneously driven by said motor drive with the wrapping belt moving at a preselected greater speed than the conveyor belt.

8. The method of claim 1 further comprising the steps of providing two spaced parallel lever arms having one end pivotally mounted on said frame and the other end supporting said upper wrapping belt tension roller, a pair of bladders mounted on said frame, each bladder contacting a representative arm at a location spaced from said pivot point whereby pressurization of said bladders causes said lever arms to rotate around said pivot points and raise said wrapping belt tension roller to control the tension of the wrapping belt.

9. The method of claim 8 wherein said wrapping belt drive roller forms a friction clutch with said wrapping belt and is driven thereby when the belt is tensioned by pressurization of said bladders and is declutched by depressurization of said bladders.

10. The method of claim 1 wherein said wrapping belt is formed of a single sheet of silicon reinforced fiberglass.

11. The method of claim 1 wherein said wrapping rollers comprise a top roller and a bottom roller, said bottom roller being of a greater diameter than the top roller.

12. The method of claim 1 wherein said wrapping rollers rotate in a clockwise direction and said mandrel in a counter clockwise direction.

13. The method of claim 1 wherein said mandrel is circular in shape for use in making circular pipes.

14. The method of claim 1 wherein said mandrel is rectangular in shape for use in making rectangular tubular structures usable in articles such as hockey sticks.

15. The method of claim 1 wherein said mandrel is in the shape of a tear-drop for producing streamlined hollow structures.

16. A method of fabricating a composite tubular member, comprising the steps of:

providing a supporting frame;

mounting a conveyor having a delivery end on said supporting frame;

placing at least one sheet of thermoplastic material on said conveyor;

conveying said sheet beneath a source of heat to soften said sheet;

providing a closed loop wrapping belt supported by spaced lower driving and upper tension rollers to lie in a vertical position orthogonally related to, but spaced from said conveyor delivery end;

arranging two wrapping rollers in spaced parallel relationship within the wrapping belt loop to form a gap coextensive with the conveyor delivery end;

feeding a bight portion of said wrapping belt into said gap to form an open loop behind said wrapping rollers;

inserting an elongated mandrel in said open loop to be trapped behind said wrapping rollers;

tensioning said wrapping belt and driving said driving roller causing said wrapping belt to circulate and to rotate said wrapping rollers in a first direction and said mandrel behind said wrapping rollers in a second, opposite direction;

conveying said softened sheet into said gap onto said moving wrapping belt whereby said sheet is fed to said rotating mandrel and wrapped therearound in spiral fashion; and providing two spaced parallel lever arms having one end pivotally mounted on said frame and the other end supporting said upper wrapping belt tension roller, a pair of bladders mounted on said frame, each bladder contacting a representative arm at a location spaced from said pivot point whereby pressurization of said bladders causes said lever arms to rotate around said pivot points and raise said wrapping belt tension roller to control the tension of the wrapping belt;

wherein said wrapping belt drive roller forms a friction clutch with said wrapping belt and is driven thereby when the belt is tensioned by pressurization of said bladders and is declutched by depressurization of said bladders.

17. The method of claim 16 wherein said source of heat is an infrared heater.

18. The method of claim 16 wherein the turns of said sheet wrapped around said mandrel in spiral fashion are bonded to each other by fusion without the addition of any extraneous agents.

19. The method of claim 16 wherein said flat conveyor belt is formed of a single sheet having a width slightly greater than the length of the article to be manufactured.

20. The method of claim 16 wherein said conveyor belt and said wrapping belt are simultaneously driven by said motor drive with the wrapping belt moving at a preselected greater speed than the conveyor belt.

21. The method of claim 16 wherein said wrapping belt is formed of a single sheet of silicon reinforced fiberglass.

22. The method of claim 16 wherein said wrapping rollers comprise a top roller and a bottom roller, said bottom roller being of a greater diameter than the top roller.

23. The method of claim 16 wherein said wrapping rollers rotate in a clockwise direction and said mandrel in a counter clockwise direction.

24. The method of claim 16 wherein said mandrel is circular in shape for use in making circular pipes.

25. The method of claim 16 wherein said mandrel is rectangular in shape for use in making rectangular tubular structures usable in articles such as hockey sticks.

26. The method of claim 16 wherein said mandrel is in the shape of a tear-drop for producing streamlined hollow structures.

* * * * *